(12) United States Patent
Lee et al.

(10) Patent No.: US 12,542,495 B2
(45) Date of Patent: Feb. 3, 2026

(54) VOLTAGE CONVERTER

(71) Applicants: Hyundai Motor Company, Seoul (KR); Kia Corporation, Seoul (KR)

(72) Inventors: Jun Young Lee, Daegu (KR); Byung Gu Kang, Hwaseong-si (KR); Dae Woo Lee, Incheon (KR); Tae Jong Ha, Songpa-gu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 287 days.

(21) Appl. No.: 18/180,935

(22) Filed: Mar. 9, 2023

(65) Prior Publication Data

US 2024/0178760 A1 May 30, 2024

(30) Foreign Application Priority Data

Nov. 29, 2022 (KR) .......................... 10-2022-0162852

(51) Int. Cl.
*H02M 3/335* (2006.01)
*H02M 1/34* (2007.01)
*H02M 1/38* (2007.01)

(52) U.S. Cl.
CPC ......... *H02M 3/33592* (2013.01); *H02M 1/34* (2013.01); *H02M 1/342* (2021.05); *H02M 1/385* (2021.05); *H02M 3/33571* (2021.05)

(58) Field of Classification Search
CPC ........ H02M 1/34; H02M 1/342; H02M 1/385; H02M 3/335; H02M 3/33569; H02M 3/33571; H02M 3/33592; H02M 1/32
See application file for complete search history.

(56) References Cited

U.S. PATENT DOCUMENTS

| | | | | |
|---|---|---|---|---|
| 5,734,563 A | * | 3/1998 | Shinada | ............ H02M 3/33592 363/21.06 |
| 6,304,461 B1 | * | 10/2001 | Walker | .............. H02M 3/33584 363/127 |
| 6,490,179 B1 | * | 12/2002 | Boylan | ............. H02M 3/33507 363/67 |
| 2015/0256087 A1 | * | 9/2015 | Jitaru | ........................ H01F 3/14 363/21.06 |

FOREIGN PATENT DOCUMENTS

JP 2010110071 A 5/2010

* cited by examiner

*Primary Examiner* — Gary L Laxton
(74) *Attorney, Agent, or Firm* — Slater Matsil, LLP

(57) ABSTRACT

An embodiment voltage converter includes a DC-DC converter and a controller. The DC-DC converter includes a transformer, a main switch connected to an input terminal and the transformer, and first and second synchronous rectification switches connected to an output terminal and the transformer, and the controller is configured to switch the main switch so that the DC-DC converter adjusts a voltage of the input terminal and outputs the voltage to the output terminal and to complementarily switch the first and second synchronous rectification switches without dead time.

20 Claims, 10 Drawing Sheets

MODE IV (t3<t<t4)

VOLTAGE CONVERTER

CROSS-REFERENCE TO RELATED APPLICATIONS

This application claims the benefit of Korean Patent Application No. 10-2022-0162852, filed on Nov. 29, 2022, which application is hereby incorporated herein by reference.

TECHNICAL FIELD

The present disclosure relates to a voltage converter.

BACKGROUND

A vehicle can be provided with a DC-DC converter, such as a low-voltage DC-DC converter (LDC), which steps down a voltage of a high-voltage battery to supply power to an electric load or an auxiliary battery.

The DC-DC converter may have a switching circuit on an input terminal and a rectifier circuit on an output terminal. In a method for configuring a rectifier circuit, there is an asynchronous rectification method using a diode and a synchronous rectification method using a switching element, and the synchronous rectification method may have a higher power conversion efficiency than the asynchronous rectification method.

In general, the switch elements included in the switching circuit on the input terminal side are complementarily switched with a dead time, and the switching time of the output terminal side synchronous rectifier circuit is synchronized with the switching time of the input terminal side switching circuit. At this time, the dead time may be defined as a time when a turn-off state of the switch elements is maintained to prevent the switch elements from being short circuited when the complementarily switched switch elements are turned on at the same time.

When the switch elements included in the synchronous rectifier circuit on the output terminal side switch complementarily, as all switch elements are turned off during the dead time interval, the current loop of the synchronous rectifier circuit may be interrupted, and the overvoltage may occur due to the interruption of the current loop.

For example, in the state where the negative current occurs in the synchronous rectifier circuit according to the load condition of the DC-DC converter before the dead time interval when all the switch elements of the synchronous rectifier circuit are turned off during the dead time, the current loop that allows the negative current to flow is interrupted so that the overvoltage may occur in the switch elements.

Matters described as the related art are provided merely for promoting understanding for the background of embodiments of the disclosure and should not be taken as the prior art already known to a person having ordinary knowledge in the art.

SUMMARY

The present disclosure relates to a voltage converter. Particular embodiments relate to a voltage converter that prevents an overvoltage during a switching operation.

Therefore, embodiments of the present disclosure have been made in view of problems in the art, and an embodiment of the present disclosure achieves the prevention of overvoltage during a switching operation by a complementary switching of switch elements included in a synchronous rectifier circuit of a DC-DC converter without dead time.

The technical embodiments of the present disclosure are not limited to the above-described technical embodiments and other technical embodiments which are not described herein will become apparent to those skilled in the art from the following description.

According to one embodiment of the present disclosure, there is provided a voltage converter including a DC-DC converter including a transformer, a main switch connected to an input terminal and the transformer, and first and second synchronous rectification switches connected to an output terminal and the transformer, and a controller switching the main switch so that the DC-DC converter adjusts the voltage of the input terminal and outputs the voltage to the output terminal and causes complementary switching of the first and second synchronous rectification switches without dead time.

In one example, the controller may be configured to set a duty ratio of the main switch so that the DC-DC converter steps down the voltage on the input terminal to output on the output terminal, and the duty ratio of the main switch may correspond to a ratio of a time interval where the main switch is turned on to a preset switching period.

In one example, the sum of the time interval in which the first and second synchronous rectification switches turn on within the preset switching period may be set as the preset switching period, and the time interval that the first synchronous rectification switch is turned on may include the time interval that the main switch turns on.

In one example, the current of the first and second synchronous rectification switches may have a negative direction in at least a part of a preset switching period.

In one example, in the main switch, the source terminal may be connected to the input terminal, and the drain terminal may be connected to one end of the primary side of the transformer.

In one example, in the first synchronous rectification switch, the source terminal may be connected to one end of the secondary side of the transformer, and the drain terminal is connected to the output terminal. In the second synchronous rectification switch, the source terminal is connected to the other end of the secondary side of the transformer, and the drain terminal may be connected to the output terminal.

In one example, the voltage converter may further include a clamp switch connected to the main switch and a clamp capacitor connected to the clamp switch.

The controller may complementarily switch the main switch and the clamp switch with the dead time.

In the clamp switch, the source terminal may be connected to the drain terminal of the main switch and the drain terminal is connected to one end of the clamp capacitor, and in the clamp capacitor, the other end thereof may be connected to other end of the primary side of the transformer.

In one example, each of the main switch, the clamp switch, the first synchronous rectification switch, and the second synchronous rectification switch may be implemented as a metal oxide semiconductor field effect transistor (MOSFET).

In one example, the controller may control the main switch according to an operation mode of the DC-DC converter, the clamp switch, and the state of the first synchronous rectification switch and the second synchronous rectification switch.

The operation mode includes first, second, third, and fourth operation modes sequentially performed, wherein the first operation mode corresponds to a mode in which the main switch and the first synchronous rectification switch are turned on and the clamp switch and the second synchronous rectification switch are turned off, the second operation mode corresponds to a mode in which the second synchronous rectification switch is turned on and the main switch, the clamp switch, and the first synchronous rectification switch are turned off, the third operation mode corresponds to a mode in which the clamp switch and the second synchronous rectification switch are turned on, and the main switch and the first synchronous rectification switch are turned off, and the fourth operation mode may correspond to a mode in which the first synchronous rectification switch is turned on and the main switch, the clamp switch, and the second synchronous rectification switch are turned off.

The controller may simultaneously turn on the first synchronous rectification switch and the second synchronous rectification switch at a time point when the first operation mode is switched to the second operation mode and a time point when the third operation mode is switched to the fourth operation mode.

According to embodiments of the present disclosure, switch elements included in a synchronous rectifier circuit of the DC-DC converter are complementarily switched without dead time, thereby preventing overvoltage during a switching operation.

Advantages which may be obtained in this specification are not limited to the aforementioned advantages, and various other advantages may be evidently understood by those skilled in the art to which the present disclosure pertains from the following description.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION OF ILLUSTRATIVE EMBODIMENTS

Figure 1:
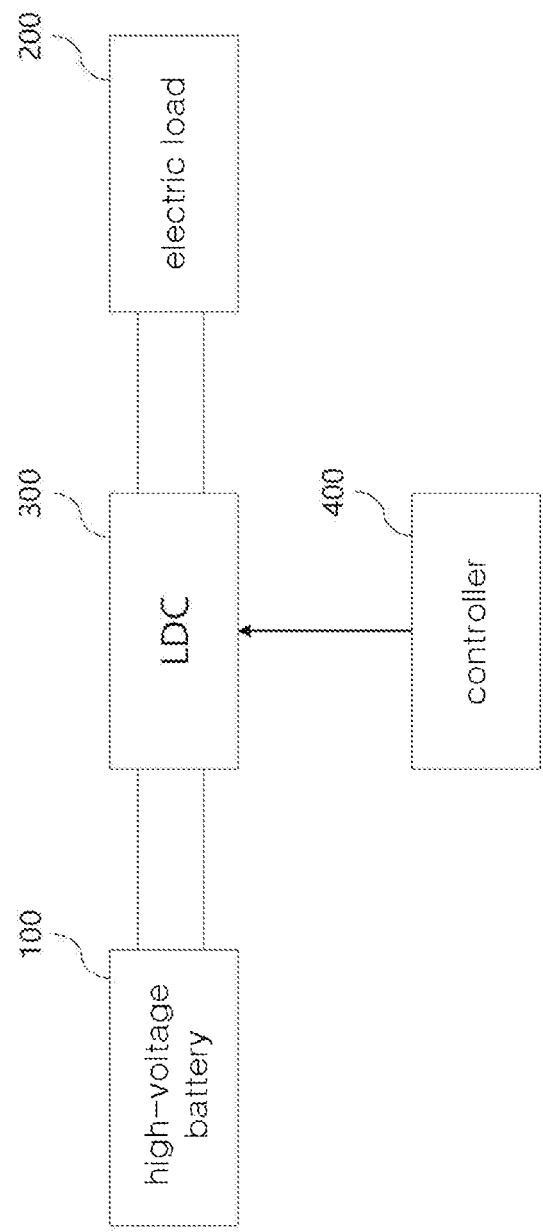
FIG. 1 is a block diagram showing a configuration of a power conversion system included in a vehicle according to an embodiment of the present disclosure.

Hereinafter, embodiments of the present disclosure will be described in greater detail with reference to the accompanying drawings. In describing embodiments of the present disclosure, for ease of understanding, the same reference numerals are used to denote the same components throughout the drawings, and repetitive description on the same components will be omitted.

In terms of describing the embodiments of the present disclosure, detailed descriptions of related art will be omitted when they may make the subject matter of the embodiments of the present disclosure rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents, and substitutions within the scope and spirit of the present disclosure.

In the description of the following embodiments, the term "preset" means that the numerical value of a parameter is determined in advance when the parameter is used in a process or algorithm. Depending on an embodiment, the numerical value of a parameter may be set when a process or algorithm starts or may be set during a period in which the process or algorithm is executed.

Terms such as "first" and "second" may be used to describe various components, but the components should not be limited by the above terms. In addition, the above terms are used only for the purpose of distinguishing one component from another.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

In one example, each controller is a communication device that communicates with other controllers or sensors to control the function that it is responsible for, a memory that stores an operating system or logic commands and input and output information, and one or more processors that performs determination, calculation, decision, and the like, which is necessary for the control of the function that it is responsible therefor.

FIG. 1 is a block diagram showing a configuration of a power conversion system included in a vehicle according to an embodiment of the present disclosure.

Referring to FIG. 1, the power conversion system may include a high-voltage battery 100, an electric load 200, a DC-DC converter 300 disposed between the high-voltage battery 100 and the electric load 200, and a controller 400 controlling the DC-DC converter 300 and a switching of the DC-DC converter 300.

The DC-DC converter 300 may be implemented as the electric load 200 by stepping down the voltage of the high-voltage battery 100 or a low voltage DC-DC converter (LDC) which provides the power to an auxiliary battery (not shown). Topologies for implementing the LDC include a phase-shift full bridge (PSFB) method and an active clamp forward (ACF) method.

In the present exemplary embodiment, an operation of controlling the DC-DC converter will be described assuming an example an example in which the DC-DC converter is implemented in an active clamp forward (ACF) method. The configuration of the DC-DC converter, which is implemented in the ACF method, may be described in detail by referring to FIGS. 2, 3, and 4.

Figure 2:
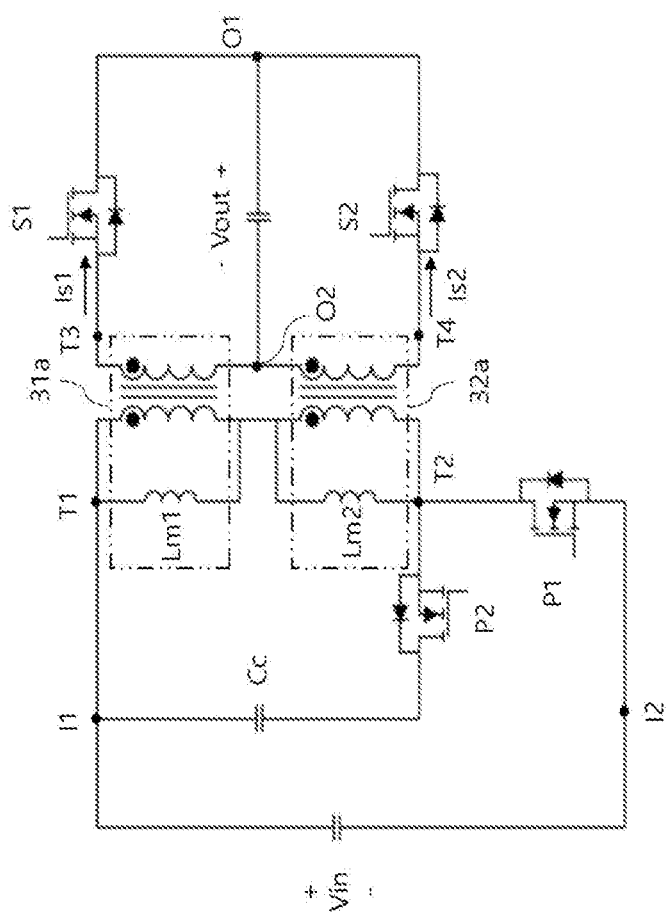
FIGS. 2, 3, and 4 are circuit diagrams illustrating an example of a DC-DC converter according to an embodiment of the present disclosure.
Figure 3:
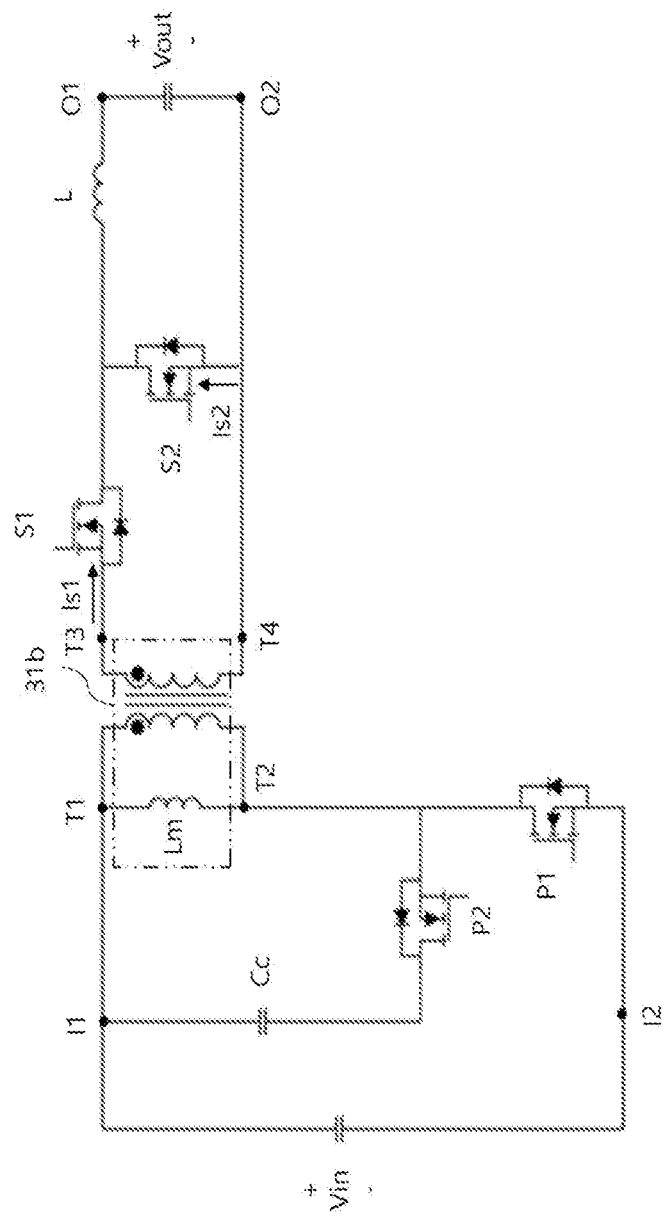
Figure 4:
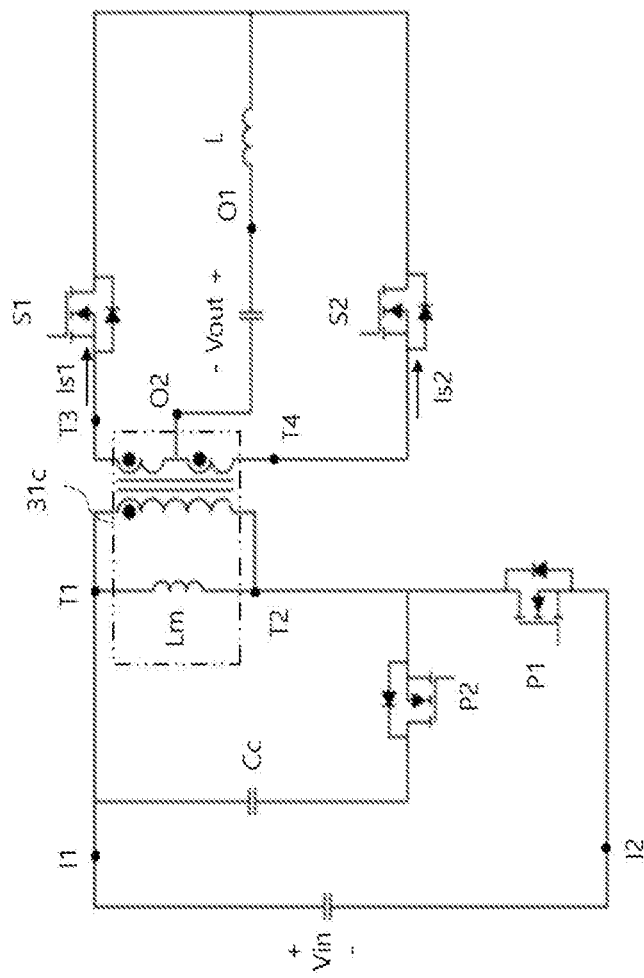

FIGS. 2, 3, and 4 are circuit diagrams illustrating an example of a DC-DC converter according to an embodiment of the present disclosure.

Referring to FIGS. 2, 3, and 4, the ACF converter may correspond to an isolated power converter, in which a transformer is disposed between switching circuits on the input terminals I1 and I2 and rectifier circuits on the output terminals O1 and O2. More particularly, the switching circuit of the ACF converter may include a main switch P1 for adjusting the level of the output voltage Vout, a clamp capacitor Cc for absorbing the energy stored in the magnetized inductance of the transformer (Lm1 and Lm2 in FIG. 2, Lm in FIGS. 3 and 4), and a clamp switch P2. In the method for configuring the rectifier circuit on the output terminal of the ACF converter, there is an asynchronous rectification method using a diode and a synchronous rectification method using a switch element, and the synchronous rectification method may have higher power conversion efficiency than the asynchronous rectification method.

Referring to FIG. 2, a circuit diagram of a DC-DC converter 300a implemented as an active clamp forward (ACF) converter using two transformers is illustrated.

The DC-DC converter 300a may have input terminals I1 and I2 to which the input DC voltage Vin is applied and output terminals O1 and O2 to which an output DC voltage Vout is output, and includes two transformers 31a and 32a, a main switch P1, a clamp capacitor Cc, a clamp switch P2, a first synchronous rectification switch S1 and a second synchronous rectification switch S2. In the present exemplary embodiment, each of the main switch P1, the clamp switch P2, the first synchronous rectification switch S1, and the second synchronous rectification switch S2 may be implemented as a metal oxide semiconductor field effect transistor (MOSFET).

The primary side terminal T1 of the transformers 31a and 32a are connected to the input terminal I1, and the primary side terminal T2 of the transformers 31a and 32a are connected to the input terminal I2 through the main switch P1. The main switch P1 may have a source terminal connected to the input terminal I2 and a drain terminal connected to the primary side terminals T2 of the transformers 31a and 32a. The clamp switch P2 may have a source terminal connected to the drain terminal of the main switch P1 at the primary side terminal T2 of the transformers 31a and 32a and a drain terminal connected to one end of the clamp capacitor Cc. The other end of the clamp capacitor Cc may be connected to the primary side terminal T1 of the transformers 31a and 32a at the input terminal I1.

The secondary side terminal T3 of the transformers 31a and 32a may be connected to the output terminal O1 through the first synchronous rectification switch S1, and the secondary side terminal T4 of the transformer 32a may be connected to the output terminal O1 through the second synchronous rectification switch S2. In this case, the output terminal O2 may be connected to a contact point between the secondary coil of the transformer 31a and the secondary coil of the transformer 32a. In the first synchronous rectification switch S1, a source terminal is connected to the secondary side terminal T3 of the transformers 31a and 32a and a drain terminal is connected to the output terminal O1, and in the second synchronous rectification switch S2, a source terminal is connected to the secondary side terminal T4 of the transformers 31a and 32a and a drain terminal is connected to the output terminal O1.

Referring to FIG. 3, a circuit diagram of a DC-DC converter 300b implemented as an active clamp forward (ACF) converter using a transformer 31b using a single-ended method is illustrated. The DC-DC converter 300b may include a transformer 31b, a main switch P1, a clamp capacitor Cc, a clamp switch P2, a first synchronous rectification switch S1, a second synchronous rectification switch S2, and an inductor L. The inductor L is connected between the first synchronous rectification switch S1 and the output terminal O1, and the output terminal O2 may be directly connected to the secondary side terminal T4 of the transformer 31b.

Referring to FIG. 4, a circuit diagram of a DC-DC converter 300c implemented as an active clamp forward (ACF) converter using a transformer 31c using a double-ended method is illustrated. The DC-DC converter 300c may include a transformer 31c, a main switch P1, a clamp capacitor Cc, a clamp switch P2, a first synchronous rectification switch S1, a second synchronous rectification switch S2, and an inductor L. The inductor L is connected between the first synchronous rectification switch S1 and the output terminal O1, and the output terminal O2 may be connected to a contact point of the secondary coils included in the transformer 31c.

In the active clamp forward (ACF) converter, the main switch P1 and the clamp switch P2 may be complementarily switched with a dead time. In the present exemplary embodiment, the dead time is defined as the time during which the turn-off state of the switch elements needs to be maintained to prevent the switch elements from being short-circuited when the switch elements that are switched on complementarily are turned on at the same time. In this case, the complementary switching means that the switch elements are alternately switched.

In addition, in an active clamp forward (ACF) converter, the synchronous rectification switches S1 and S2 are generally switched complementarily with a dead time in synchronization with the switching timing of the main switch P1 and the clamp switch P2.

In the case of complementary switching of the synchronous rectification switches S1 and S2 with a dead time, as all the synchronous rectification switches S1 and S2 are turned off in the dead time interval, the current loop of the synchronous rectification switches S1 and S2 may be interrupted, and overvoltage may occur in the synchronous rectification switches S1 and S2 due to the interruption of the current loop.

For example, before the dead time interval and in the state where the direction of current Is1 or Is2 is negative according to the load condition of the DC-DC converter when all the synchronous rectification switches S1 and S2 are turned off during the dead time interval, a loop through which negative current may flow is blocked, and overvoltage may occur in the synchronous rectification switches S1 and S2.

To solve this problem, by detecting that the switch currents Is1 and Is2 are zero current through a separate current sensor before the switch currents Is1 and Is2 have a negative direction, the synchronous rectification switches S1 and S2 can be turned off. However, such a method requires a separate current sensor, and when the separate current sensor does not accurately detect zero current, there is a problem in that stability of the system is degraded.

Accordingly, in the present exemplary embodiment, it is proposed to prevent overvoltage during a switching operation by complementary switching of the synchronous rectification switches S1 and S2 without dead time. A method for controlling the DC-DC converter described above is illustrated in FIG. 5.

Figure 5:
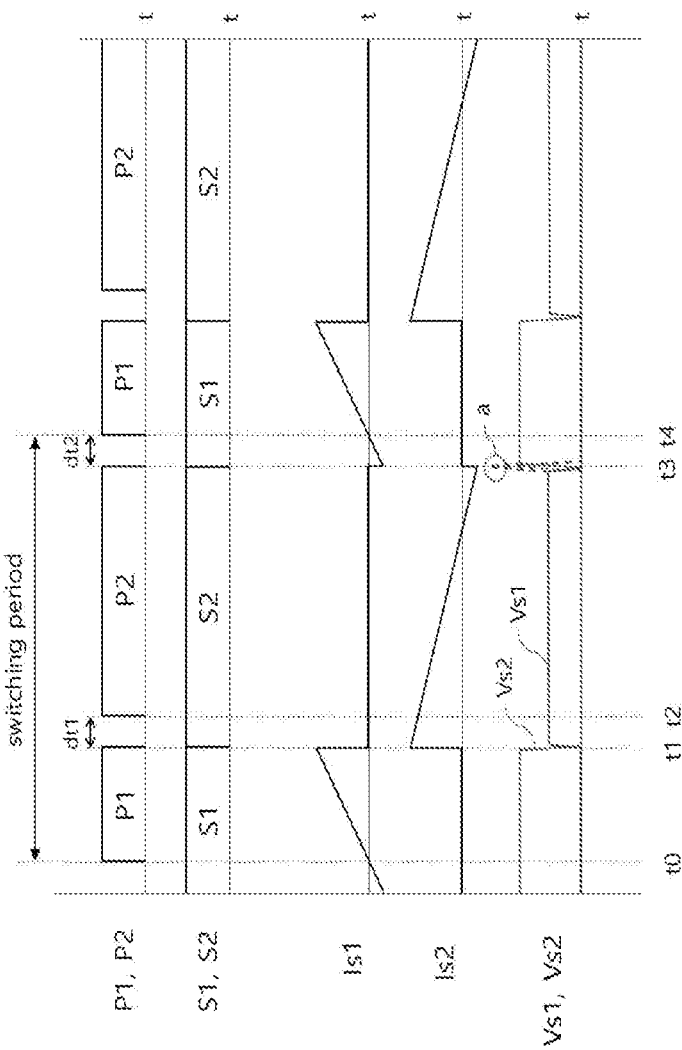
FIG. 5 is a waveform diagram illustrating a process in which a controller controls a switching operation of a DC-DC converter according to an embodiment of the present disclosure.

FIG. 5 is a waveform diagram illustrating a process in which a controller controls a switching operation of a DC-DC converter according to an embodiment of the present disclosure.

Referring to FIG. 5, the controller 400 may complementarily switch the main switch P1 and the clamp switch P2 with dead times dt1 and dt2. More particularly, the controller 400 may switch the main switch P1 so that the DC-DC converter 300 adjusts the voltage of the input terminal and outputs the voltage to the output terminal. The controller 400 may set the duty ratio of the main switch P1 so that the DC-DC converter 300 steps down the voltage at the input terminal and outputs it to the output terminal. The duty ratio of the main switch P1 may correspond to a ratio of a time interval during which the main switch P1 is turned on to a preset switching period.

The current Is1 of the first synchronous rectification switch S1 and the current Is2 of the second synchronous rectification switch S2 may have a negative direction in at least a part of a preset switching period according to a load of the DC-DC converter 300. That is, the direction of the current Is2 may correspond to a negative direction, such as the time point of 't3'. Unlike illustrated in FIG. 5, the direction of the switching current Is1 at the time of 't1' may correspond to a negative direction depending on the duty ratio of the main switch P1.

Therefore, to prevent the current loop interruption due to the negative current in the time intervals t1<t<t2 and t3<t<t4, the controller 400 may complementarily switch the first synchronous rectification switch S1 and the second synchronous rectification switch S2 without dead times dt1 and dt2. That is, the sum of the time intervals at which the first synchronous rectification switch S1 and the second synchronous rectification switch S2 are turned on within the preset switching period may be set as the preset switching period. The time interval in which the first synchronous rectification switch S1 is turned on includes the time interval in which the main switch P1 is turned on, and the time interval in which the second synchronous rectification switch S2 is turned on may include a time period in which the clamp switch P2 is turned on.

Accordingly, the voltage Vs1 of the first synchronous rectification switch S1 and the voltage Vs2 of the second synchronous rectification switch S2 may have the voltage level in a certain range according to the switching period. Unlike in the present exemplary embodiment, in the case of the first synchronous rectification switch S1 and the second synchronous rectification switch S2 being switched complementarily with dead times dt1 and dt2, spikes may generate in the voltages Vs1 and Vs2 as in 'a' at the time point t3.

Meanwhile, the controller 400 may control the switching states of the main switch P1, the clamp switch P2, the first synchronous rectification switch S1, and the second synchronous rectification switch S2 according to the operation mode of the DC-DC converter 300 within a switching period.

The operation modes of the DC-DC converter 300 include a first operation mode (t0<t<t1), a second operation mode (t1<t<t2), a third operation mode (t2<<t3), and a fourth operation mode (t3<t<t4), which are sequentially performed.

The first operation mode may correspond to a mode in which the main switch P1 and the first synchronous rectification switch S1 are turned on and the clamp switch P2 and the second synchronous rectification switch S2 are turned off. The second operation mode may correspond to a mode in which the second synchronous rectification switch S2 is turned on and the main switch P1, the clamp switch P2, and the first synchronous rectification switch S1 are turned off. The controller 400 may simultaneously turn on the first synchronous rectification switch S1 and the second synchronous rectification switch S2 at a time point t1 when the first operation mode is converted to the second operation mode.

The third operation mode may correspond to a mode in which the clamp switch P2 and the second synchronous rectification switch S2 are turned on and the main switch P1 and the first synchronous rectification switch S1 are turned off. The fourth operation mode may correspond to a mode in which the first synchronous rectification switch S1 is turned on and the main switch P1, the clamp switch P2, and the second synchronous rectification switch S2 are turned off. That is, the controller 400 may simultaneously turn on the first synchronous rectification switch S1 and the second synchronous rectification switch S2 at a time point t3 when the third operation mode is converted to the fourth operation mode.

Hereinafter, the operation of the DC-DC converter 300a for each operation mode will be described by taking a DC-DC converter (300a in FIG. 2) implemented as an active clamp forward (ACF) converter using two transformers as an example.

FIGS. 6, 7, 8, 9, and 10 are diagrams describing an operation mode of a DC-DC converter according to an embodiment of the present disclosure.

Figure 6:
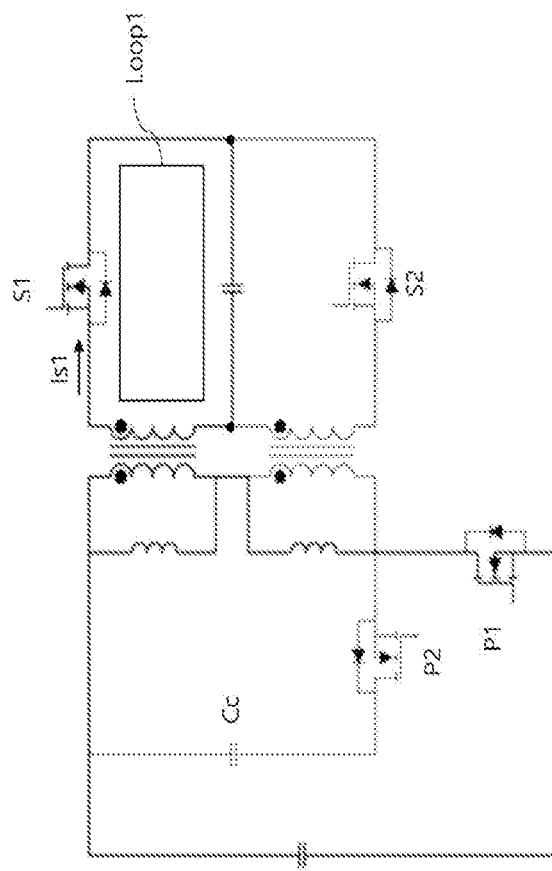
FIGS. 6, 7, 8, 9, and 10 are diagrams describing an operation mode of a DC-DC converter according to an embodiment of the present disclosure.

Referring to FIG. 6, an equivalent circuit diagram of the DC-DC converter 300a when the first operation mode (MODE I) is performed is shown. When the first operation mode is performed, the main switch P1 and the first synchronous rectification switch S1 may be turned on. A direction of the switch current Is1 corresponds to a positive direction, and a first current loop Loop1 may be formed through a channel of the first synchronous rectification switch S1.

Figure 7:
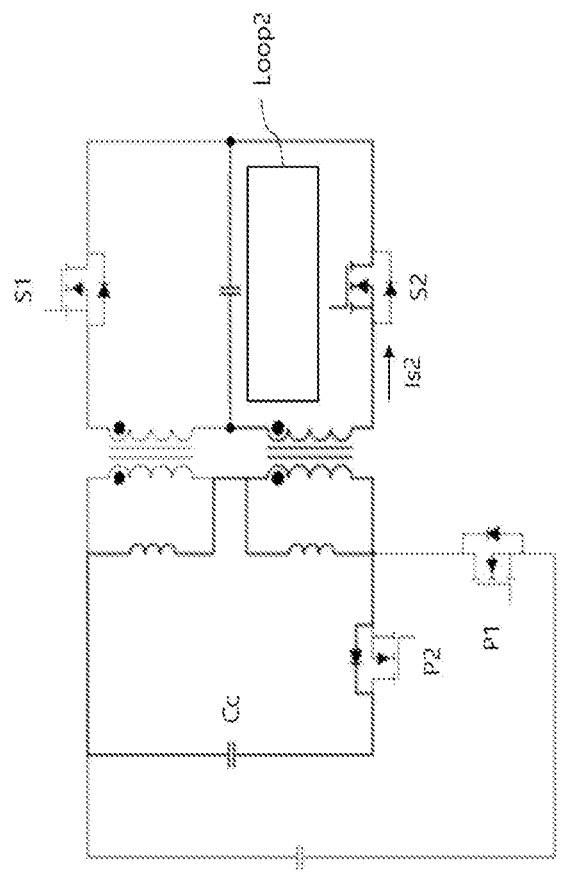

Referring to FIG. 7, an equivalent circuit diagram of the DC-DC converter 300a when the second operation mode (MODE II) is performed is shown. When the second operation mode is performed, the second synchronous rectification switch S2 may be turned on. A direction of the switch current Is2 corresponds to a positive direction, and a second current loop Loop2 may be formed through a channel of the second synchronous rectification switch S2.

Figure 8:
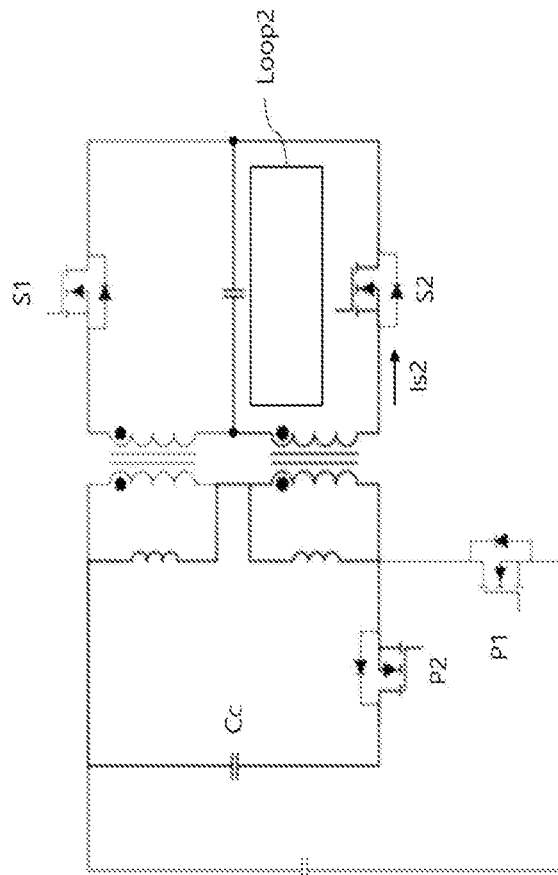

Referring to FIG. 8, an equivalent circuit diagram of the DC-DC converter 300a when the third operation mode (MODE III) is performed is shown. When the third operation mode is performed, the main switch P2 and the second synchronous rectification switch S2 may be turned on. The direction of the switch current Is2 may be changed from a positive direction to a negative direction, and a second current loop Loop2 may be formed through a channel of the second synchronous rectification switch S2.

Figure 9:
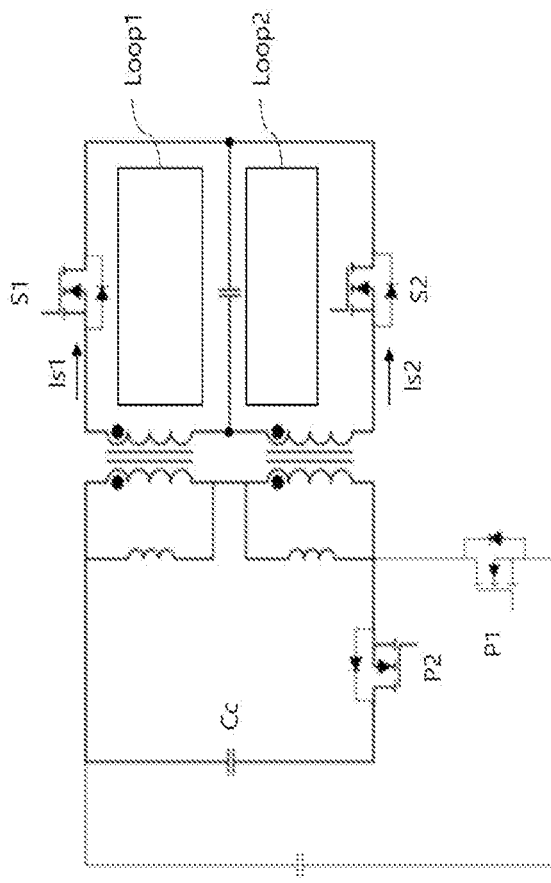

Referring to FIG. 9, an equivalent circuit diagram of the DC-DC converter 300a is shown at the time of transition from the third operation mode (MODE III) to the fourth operation mode (MODE IV). At the time of transition from the third operation mode to the fourth operation mode, the clamp switch P2, the first synchronous rectification switch S1, and the second synchronous rectification switch S2 may be turned on. At this time, the directions of the currents Is1 and Is2 correspond to negative directions, and a first current loop Loop1 may be formed through the channel of the first synchronous rectification switch S1, and a second current loop Loop2 may be formed through the channel of the second synchronous rectification switch S2. Unlike in the present exemplary embodiment, when the first synchronous current switch S1 is turned off, where the third operation mode is converted to the fourth operation mode, as the direction of the current Is1 corresponds to a negative direction, the first current loop Loop1 may be interrupted.

Figure 10:
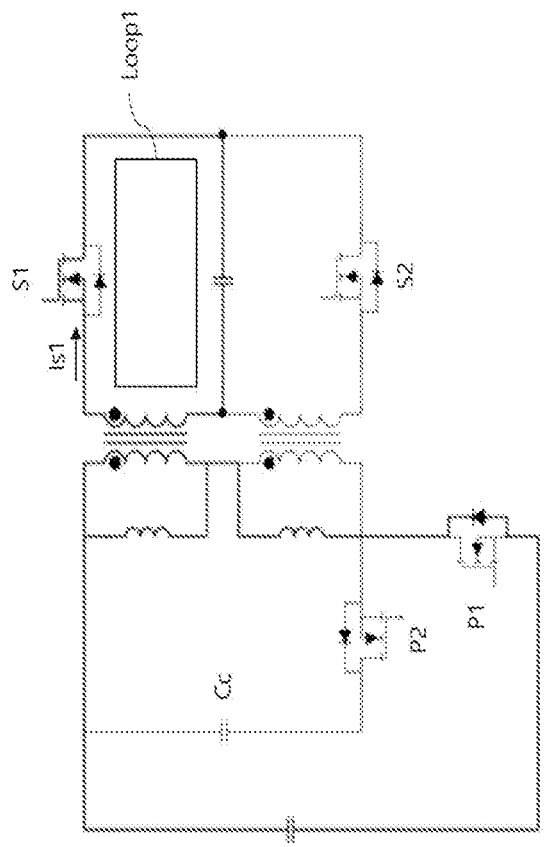

Referring to FIG. 10, an equivalent circuit diagram of the DC-DC converter 300a when the fourth operation mode (MODE IV) is performed is shown. When the fourth operation mode is performed, the first synchronous rectification switch S1 may be turned on. The direction of the current Is1 corresponds to a negative direction, and a first current loop Loop1 may be formed through a channel of the first synchronous rectification switch S1.

Embodiments of the present disclosure mentioned in the foregoing description may be implemented as code that can be written to a computer-readable recording medium and can thus be read by a computer system. The computer-readable medium may include all kinds of recording devices in which data readable by a computer system is stored. Examples of computer-readable mediums include a hard disk drive (HDD), a solid state disk (SSD), a silicon disk drive (SDD), a ROM, a RAM, a CD-ROM, a magnetic tape, a floppy disk, an optical data storage device, and the like. Therefore, the above embodiments are therefore to be construed in all aspects as illustrative and not restrictive. The scope of the present disclosure should be determined by the appended claims and their legal equivalents, not by the above description, and all changes coming within the meaning and equivalent range of the appended claims are intended to be embraced therein.

What is claimed is:

1. A voltage converter comprising:
a DC-DC converter comprising a transformer, a main switch connected to an input terminal and the transformer, and first and second synchronous rectification switches connected to an output terminal and the transformer; and
a controller configured to:
switch the main switch so that the DC-DC converter adjusts a voltage of the input terminal and outputs the voltage to the output terminal; and
complementarily switch the first and second synchronous rectification switches without dead time,
wherein the controller is further configured to control the main switch according to an operation mode of the DC-DC converter, a clamp switch, and a state of the first and second synchronous rectification switches,
wherein the operation mode comprises first, second, third, and fourth operation modes configured to be sequentially performed, and
wherein the first operation mode has the main switch and the first synchronous rectification switch turned on and the clamp switch and the second synchronous rectification switch turned off.

2. The voltage converter of claim 1,
wherein the controller is configured to set a duty ratio of the main switch so that the DC-DC converter steps down an input voltage to an output voltage, and
wherein the duty ratio of the main switch corresponds to a ratio of a first time interval where the main switch is turned on to a preset switching period.

3. The voltage converter of claim 2,
wherein a second time interval, in which the first and second synchronous rectification switches are turned on within the preset switching period, is set as the preset switching period, and
wherein a third time interval, in which the first synchronous rectification switch is turned on, includes the first time interval.

4. The voltage converter of claim 1, wherein a current flowable through the first synchronous rectification switch or the second synchronous rectification switch has a negative direction in a part of a preset switching period.

5. The voltage converter of claim 1, wherein a source terminal of the main switch is connected to the input terminal and a drain terminal of the main switch is connected to one end of a primary side of the transformer.

6. The voltage converter of claim 1,
wherein a source terminal of the first synchronous rectification switch is connected to a first secondary side terminal of the transformer and a drain terminal of the first synchronous rectification switch is connected to the output terminal, and
wherein a source terminal of the second synchronous rectification switch is connected to a second secondary side terminal of the transformer and a drain terminal of the second synchronous rectification switch is connected to the output terminal.

7. A voltage converter comprising:
a DC-DC converter comprising a transformer, a main switch connected to an input terminal and the transformer, first and second synchronous rectification switches connected to an output terminal and the transformer, a clamp switch connected to the main switch, and a clamp capacitor connected to the clamp switch; and
a controller configured to:
switch the main switch so that the DC-DC converter adjusts a voltage of the input terminal and outputs the voltage to the output terminal; and
complementarily switch the first and second synchronous rectification switches without a dead time,
wherein the controller is further configured to control the main switch according to an operation mode of the DC-DC converter, the clamp switch, and a state of the first and second synchronous rectification switches,
wherein the operation mode comprises first, second, third, and fourth operation modes configured to be sequentially performed, and
wherein the first operation mode has the main switch and the first synchronous rectification switch turned on and the clamp switch and the second synchronous rectification switch turned off.

8. The voltage converter of claim 7, wherein the controller is configured to complementarily switch the main switch and the clamp switch with a dead time.

9. The voltage converter of claim 7,
wherein a source terminal of the clamp switch is connected to a drain terminal of the main switch and a drain terminal of the clamp switch is connected to a first end of the clamp capacitor, and
wherein a second end of the clamp capacitor is connected to a primary side terminal of the transformer.

10. The voltage converter of claim 7, wherein each of the main switch, the clamp switch, the first synchronous rectification switch, and the second synchronous rectification switch is a metal oxide semiconductor field effect transistor (MOSFET).

11. The voltage converter of claim 7,
wherein the second operation mode has the second synchronous rectification switch turned on and the main switch, the clamp switch, and the first synchronous rectification switch turned off, wherein the third operation mode has the clamp switch and the second synchronous rectification switch turned on and the main switch and the first synchronous rectification switch turned off, and wherein the fourth operation mode has the first synchronous rectification switch turned on and the main switch, the clamp switch, and the second synchronous rectification switch turned off.

12. The voltage converter of claim 11, wherein the controller is configured to simultaneously turn on the first synchronous rectification switch and the second synchronous rectification switch at a time point when the first operation mode is switched to the second operation mode and at a time point when the third operation mode is switched to the fourth operation mode.

13. The voltage converter of claim 7, wherein the second operation mode has the second synchronous rectification switch turned on and the main switch, the clamp switch, and the first synchronous rectification switch turned off.

14. The voltage converter of claim 13, wherein the third operation mode has the clamp switch and the second synchronous rectification switch turned on and the main switch and the first synchronous rectification switch turned off.

15. The voltage converter of claim 14, wherein the fourth operation mode has the first synchronous rectification switch turned on and the main switch, the clamp switch, and the second synchronous rectification switch turned off.

16. A method for operating a voltage converter, wherein the voltage converter includes a DC-DC converter comprising a transformer, a main switch connected to an input terminal and the transformer, first and second synchronous rectification switches connected to an output terminal and the transformer, a clamp switch connected to the main switch, and a clamp capacitor connected to the clamp switch, the method comprising:

switching the main switch so that the DC-DC converter adjusts a voltage of the input terminal and outputs the voltage to the output terminal;

complementarily switching the first and second synchronous rectification switches without a dead time;

controlling the main switch according to an operation mode of the DC-DC converter, the clamp switch, and a state of the first and second synchronous rectification switches, wherein the operation mode comprises first, second, third, and fourth operation modes to be sequentially performed; and in the first operation mode, turning on the main switch and the first synchronous rectification switches and turning off the clamp switch and the second synchronous rectification switch.

17. The method of claim 16, further comprising complementarily switching the main switch and the clamp switch with a dead time.

18. The method of claim 16, wherein each of the main switch, the clamp switch, the first synchronous rectification switch, and the second synchronous rectification switch is a metal oxide semiconductor field effect transistor (MOSFET).

19. The method of claim 16 further comprising:

in the second operation mode, turning on the second synchronous rectification switch and turning off the main switch, the clamp switch, and the first synchronous rectification switch;

in the third operation mode, turning on the clamp switch and the second synchronous rectification switch and turning off the main switch and the first synchronous rectification switch; and in the fourth operation mode, turning on the first synchronous rectification switch and turning off the main switch, the clamp switch, and the second synchronous rectification switch.

20. The method of claim 19, further comprising simultaneously turning on the first synchronous rectification switch and the second synchronous rectification switch at a time point when the first operation mode is switched to the second operation mode and at a time point when the third operation mode is switched to the fourth operation mode.

* * * * *